United States Patent [19]

Price

[11] B 3,983,578

[45] Sept. 28, 1976

[54] TICKET INFORMATION RECORDING AND WEB PARTING MECHANISM

[75] Inventor: George Edmund Price, San Jose, Calif.

[73] Assignee: International Business machines Corporation, Armonk, N.Y.

[22] Filed: July 1, 1974

[21] Appl. No.: 484,365

[44] Published under the second Trial Voluntary Protest Program on January 27, 1976 as document No. B 484,365.

[52] U.S. Cl. .................................. 360/1; 360/2; 101/224; 101/226; 83/304; 346/24; 83/346
[51] Int. Cl.² ................................... G11B 5/00
[58] Field of Search ..................... 101/66–69, 101/224, 226–227; 340/174.1; 83/304–305, 337, 346, 349, 224; 346/24; 360/84, 101, 2, 1

[56] References Cited
UNITED STATES PATENTS

| | | | |
|---|---|---|---|
| 1,981,486 | 11/1934 | Wheeler | 83/512 |
| 2,330,235 | 9/1943 | Peters | 83/337 |
| 3,601,042 | 8/1971 | Hamisch | 101/69 |
| 3,651,503 | 3/1972 | Kaho | 340/174.1 |
| 3,668,962 | 6/1972 | Chapman | 83/337 X |
| 3,668,963 | 6/1972 | Davis | 83/346 |
| 3,685,760 | 8/1972 | Fedor | 242/68.7 X |
| 3,704,820 | 12/1972 | Frederick et al. | 226/34 |
| 3,745,863 | 7/1973 | Murre et al. | 83/224 |
| 3,745,864 | 7/1973 | Watson | 83/295 |

*Primary Examiner*—Clyde I. Coughenour
*Assistant Examiner*—E. M. Coven
*Attorney, Agent, or Firm*—George E. Roush

[57] ABSTRACT

This ticket making machine is capable of issuing a single ticket without waste of ticket stock. A web of ticket stock having a magnetic stripe record surface is arranged to be advanced around a rotating carrier having a magnetic recording unit and one ticket (web) parting member arranged internally threof. The web is passed between the rotating carrier and a complementary ticket (web) parting member. The peripheral speed of the rotating carrier is very much greater than the speed of the advancing web, whereby the information is magnetically recorded in close to conventional manner. The one parting member is a double-ended anvil arranged to be rotated into and out of position for parting the web in cooperation with a blade forming the complementary parting member. A camming surface arrangement in the same frame structure as the carrier and web are mounted and a cam follower coupled to the anvil toggles the latter on demand for exerting relatively light force for engaging the two in parting the web. Wire and/or ink-jet printer apparatus is arranged on the frame structure for printing the desired information in human readable form in addition to the magnetic recording.

8 Claims, 5 Drawing Figures

TICKET INFORMATION RECORDING AND WEB PARTING MECHANISM

The invention relates to the preparation of merchandizing labels on tickets "in house" and the like, and it particularly pertains to such tickets having magnetic recording thereon, although it is not limited thereto.

The prior art is replete with ticket web printing and parting arrangements. Tickets with magnetic stripes for recording information therein are known as are arrangements for the recording. Also, devices for making merchandizing tickets and the like "in house" are known. By "in house" is meant the operation of a ticket maker by a clerk to tailor tickets to the immediate use of the merchandizer.

Pertinent references to the subject of the invention are to be found in the U.S. patents:

| | | | |
|---|---|---|---|
| 971,022 | 09/1910 | Cooper | — |
| 1,581,236 | 05/1926 | Speer | — |
| 1,631,879 | 06/1927 | Molins | — |
| 1,853,434 | 04/1932 | Kling | — |
| 1,981,486 | 11/1934 | Wheeler | 131/49 |
| 2,026,443 | 12/1935 | Tomlin | 270/65 |
| 2,122,796 | 07/1938 | Horton | 164/68 |
| 2,274,452 | 02/1942 | MacFarren | 164/68 |
| 2,330,235 | 09/1943 | Peters | 164/50 |
| 2,336,957 | 12/1943 | Pierce | 164/68 |
| 3,601,042 | 08/1971 | Hamisch Sr. | 101/69 |
| 3,651,503 | 03/1972 | Kono | 340/174.1 |
| 3,685,760 | 08/1972 | Fedor | 242/78.7 |
| 3,704,820 | 12/1972 | Frederick etal | 226/34 |

The patents to Cooper, Speer, Horton and MacFarren are all directed to flying shears having two cylindrical intracting blade rotary carriers for cutting web stock invariably at predetermined lengths. The patent to Molins is directed to flying shears having one rotary cylindrical blade carrier and a fixed shear blade, while the patent to Kling is quite similar but has only rotating arm carriers. Gear operated carriers are shown and described in the patents to Cooper, Tomlin, Macfarren, Peters and Pierce. The patent to Wheeler is directed to a cam driven shear that can not be operated selectively. Apparatus for printing tags of uniform length but selectively parted in two printing operations for each tag without waste of stock is shown and described in the patent to Hamisch Sr. Kono discloses tag making apparatus with both printing and magnetic recording but requiring that apertures be prepunched in the tag stock. The patents to Fedor and to Frederick and Sims Jr. are directed to tag stock roll holders and feed control apparatus. While all of these patent references are pertinent to the invention, they comprise structures that differ as well as seen from the novel combinations to be described hereinafter.

The objects of the invention indirectly referred to hereinbefore and those that will appear as the specification progresses are attained in a combination of basic components and newly developed structures for flexibility in making tickets or tags in any integral number without waste of even one ticket length of stock.

Roll ticket stock rests on belts which ride on pulleys and are driven conventionally. An electric switch actuates the driving mechaniam. A thin spring leaf over which the ticket stock rides controls the switch for feeding stock smoothly to a head and cutter unit. Drive capstans drive the ticket stock through the head and cutter unit and past a printer assembly. When more stock is needed the switch is operated and more stock is driven out. The magnetic recording is done by rotating electromagnetic transducers within the head and cutter unit. Printing is effected by a wire printer assembly. A light source is used with light fibers and photo devices to control the electronics.

Recording is confined to a predetermined magnetic stripe on the ticket. After recording, the data is read back and verified in an associated data processor. If the data is correctly recorded, the wire printer assembly is actuated at the proper phase relationship for printing the same data on the corresponding ticket. If incorrect recording is sensed, the printer assembly is cause to indicate the mistake, as by printing "VOID."

The rotating transducer allows magnetic reading to occur while printer is not active. This prevents electric print noise from entering into and interfering with the readback signal.

The tickets are continuously encoded magnetically and printed in a strip even though the speed requirements of encoding and printing are quite different. The ticket stock is driven at printing speed and the head to ticket speed is approximately ten times greater. A principle advantage of this machine is that of being able to keep the tickets in strips even to a whole roll when desired. This makes subsequent handling easier than with individual tickets. Where individual tickets are desired, however, they are readily parted on each recording.

In order that full advantage of the invention obtain in practice, a preferred embodiment, given by way of example only, is described hereinafter with reference to the accompanying drawing, forming a part of the specification, and in which.

Figure 1:
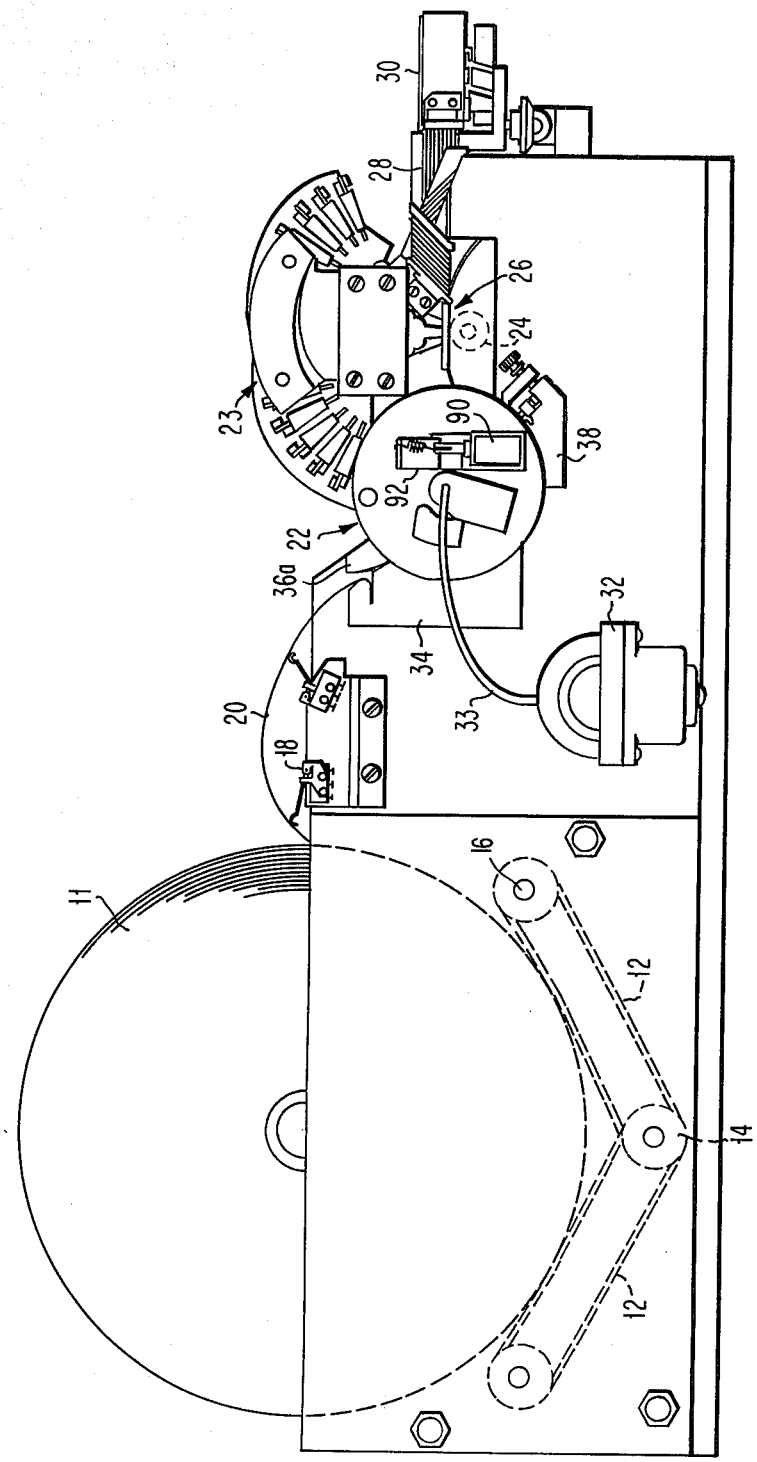
FIG. 1 is an elevation view of a magnetic stripe ticket recorder and printer according to the invention.

One arrangement for the magnetic stripe recorder and data printer according to the invention which was built and tested is shown in FIG. 1. A roll of practically any size ticket stock 11 rests on two belts 12 which ride on pulleys 14. The pulley and belt system is driven through a shaft 16. A motor with a gear box drives the shaft 16 through a belt. A switch 18 controls the motor which drives the shaft 16. A thin spring leaf 20 over which the ticket stock rides controls the switch 18 for feeding stock smoothly to a head and cutter unit 22. Drive capstans (not visible except for one capstan 24) drive the ticket stock through the head and cutter unit 22 and past a printer assembly 26. When more stock is needed the switch 18 is operated and more stock is driven out. With this arrangement a narrow range of speed is sufficient because the feed rate is substantially constant; it is just a bit faster than the capstan drive. The magnetic recording is done by rotating electromagnetic transducers within the head and cutter unit 22. Printing of the stock is accomplished by the wire printer assembly 26. A ribbon 28 and ribbon cartridge 30 are shown. An ink jet printer of conventional form may be substituted readily, and it is contemplated that known laser printing arrangements may be adapted for the purpose as well. A light source 32 is used with light fibers 33 and photo devices to control the electronics.

Recording is confined to a predetermined magnetic stripe on the ticket. After recording, the data is read back and verified in an associated data processor. If the data is correctly recorded the wire printer assembly is actuated at the proper phase relationship for printing the same data on the corresponding ticket. If incorrect recording is sensed, the printer assembly is caused to indicate the mistake, as by printing VOID.

The rotating transducer allows magnetic reading to occur while printer is not active. This prevents electric print noise from entering into and interfering with the readback signal.

In this machine, tickets are continuously encoded magnetically and printed in a strip even though the speed requirements of encoding and printing are quite different. The ticket stock 11 is driven at printing speed of about 25.4 centimeters (10 inches) per second and the head to ticket speed is approximately 254 centimeters (100 inches) per second.

Figure 2:
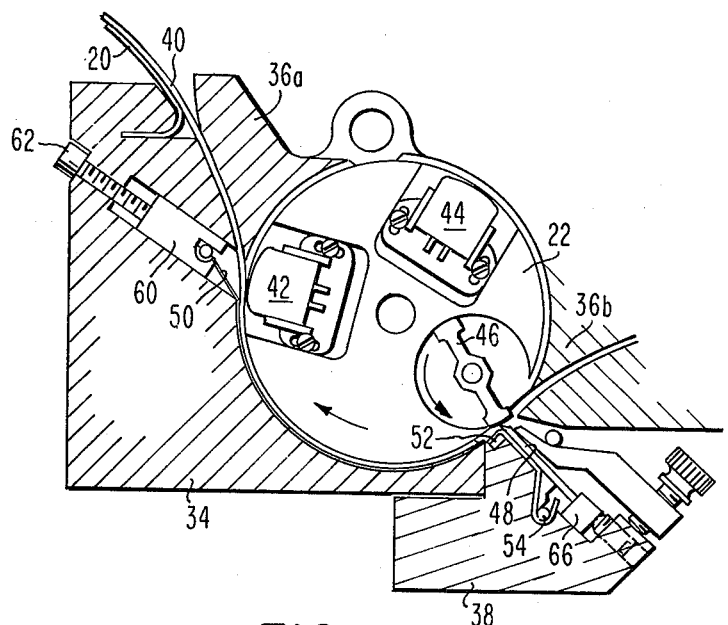
FIG. 2 is a cross-sectional view of a portion of the interior of the recorder-cutter anvil and blade mechanism according to the invention.

FIG. 2 shows additional details of the structure according to the invention.

Body members 34, 36a, 36b and 38 are arranged to support the rotating head 22 and leave a narrow channel as shown for the web 40 of ticket stock to pass around a portion of the head 22. As shown here, the web 40 has a magnetic record track and electromagnetic transducers 42, 44 arranged for recording on and reproducing from the magnetic track. An anvil 46 and a blade 48 are arranged for selectively severing the web 40.

In order to maintain the proper pressure between the head 22 and the web 40, a band 50 of resilient material, preferably "Mylar" (R), is arranged in the channel below the web 40. One end of the band 50 passes between a block 52 and the blade 48 where it is held firmly and terminates at a clamp 54 holding the band 50 even more securely. The other end of the band 50 is held in a clamp 56. The latter clamp 56 is arranged in a block 60 carried in a recess in the body member 34. The block 60 is shaped to prevent rotation and to permit in-and-out movement under control of an adjusting screw 62. Alternately, the band 50 may be of flexible material not particularly resilient in the longitudinal direction and a coil spring arranged to apply tension to the block 60. These arrangements afford accurate and uniform force for maintaining a web in proper contact with a rotating head and allows adjustment for webs of differing thickness as well as for proper contact pressure.

The ticket stock web 40 is directed by guides past the moving head 22 which contains the record electromagnetic transducer 42, reproducing electromagnetic transducer 44 and the rotating cutter anvil 46. On the other side of the ticket stock web 40 is a stripper (block) 52, the cutting rule blade 48 which is held by backing bar 66 and a clamp 68. In this figure the anvil 46 is shown just prior to the cut being made. The center of the anvil 46 rotates on bearings that are arranged in the rotating head 22. Thus, the motion of the center of the anvil 46 always moves in a circle at the rate of 720 RPM. The anvil 46 as it swings out pinches the ticket stock web 40 against the blade 48.

Figure 3A:
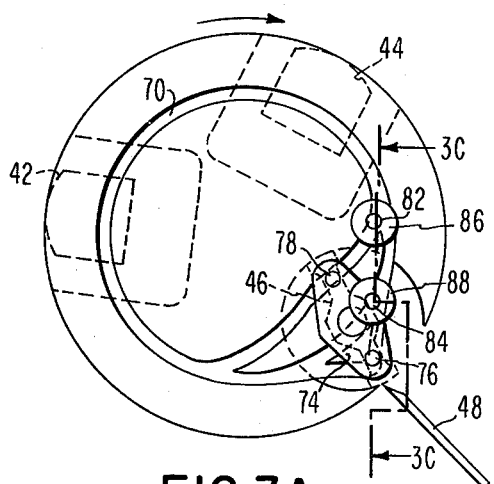
FIG. 3 (Subfigures 3A, 3B, and 3C being taken together) is a schematic diagram of the camming arrangement for controlling the operation of the cutter anvil mechanism according to the invention.
Figure 3B:
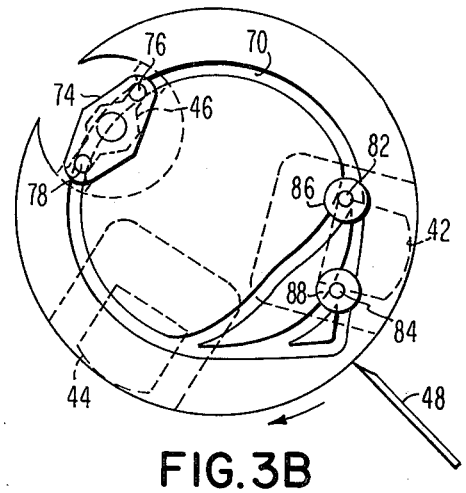
Figure 3C:
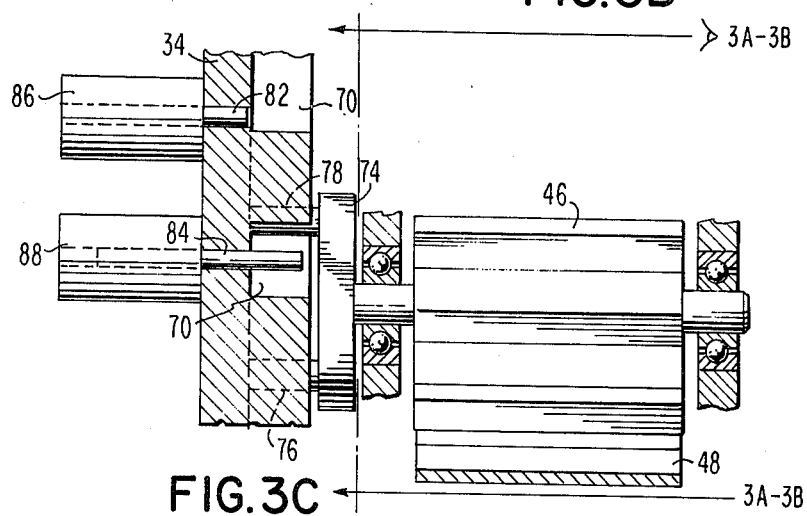

In FIG. 3 diagrams are shown illustrating an operating mechanism for selectively positioning the anvil 46. Here the rotating head 22, a stationary cam or track 70, and the anvil 46 rotating within the rotating head. On the end of the shaft carrying the anvil 46 a double crank 74 is secured. Two pins 76, 78 on the crank 74 engage in the cam track 70. FIG. 3A shows the anvil 46 just before the cut is made. FIG. 3B shows anvil 46 as it is during the rest of the parting cycle and at all times that a cut is not being made. FIG. 3C is a diagramatic view looking sideways at a portion of the cam slot 70 in the body 34. The selection of "cut" or "no cut" is accomplished by electromechanically controlled diverters 82, 84 at the positions shown. With the diverter 82 protruding into the track 70 and the diverter 84 retracted, the two crank pins 76, 78 will follow the circular path of the cam 70 and no rotation of the anvil 46 relative to the head 22 will take place. However, if the diverter 82 is retracted and the diverter 84 is in place in the cam 70, the first crank pin (76 or 78) will be deflected out along the pointed section of the cam 70 and this will cause the anvil 46 to make a 180° rotation with respect to the rotating head 22. By the time the anvil 46 has reached the cutter position, the outer portion of the anvil 46 will be stationary and the speed of the inner part will be twice the normal speed of the center. As the head 22 continues to rotate, the anvil 46 rotates through the half revolution and then remains in this position until a new cut is needed. The diverters 82, 84 are shown as plungers of solenoids 86, 88 which are arranged to be actuated in alternate modes. An electric interlock is contemplated so the transition from one state to another can only occur at the correct time. A mechanical interlock between the diverters 82 and 84 is contemplated so only one can be in position at one time and a single solenoid is then sufficient. Such interlocks are well within the skill of the artisan.

The moment arms of the head 22 and anvil 46 are such that a toggle action is formed providing high forces to do the cutting. The power for cutting is provided by the motor that drives the head 22, and the peak power is stored in the momentum of the head 22. Therefore, only a small force is required to operate the diverters 72, 74 to control the cut. The anvil 46 is made harder than the blade 48 because the blade is a low cost, easily replaceable part.

The design of this cutter is especially fine where there is a necessity for having a cutter right at the end of the space to be encoded, where a shear would not fit.

While the invention has been described and illustrated in terms of a preferred embodiment, and alternative structures have been offered, it is to be clearly understood that those skilled in the art will make additional changes without departing from the spirit and scope of the invention as defined in the appended claims.

The invention claimed is:

1. A ticket information recording and parting mechanism for producing individual tickets from web ticket stock without waste, comprising
   a frame structure,
   a continuously rotating carrier arranged on said frame structure and carrying,
   an information recording member arranged within said carrier, and
   one ticket parting anvil member rotatably mounted within said carrier,
   a complementary ticket parting blade member arranged on said frame structure,
   a web advancing arrangement on said frame structure for passing a web about a part of said carrier and between said carrier and said complementary ticket parting blade member, camming track means arranged on said frame structure and having a portion of generally circular loop configuration for presenting said anvil member in an attitude permitting said web stock to pass said blade member intact and another portion of generally triangular loop configuration for presenting said anvil member in an attitude substantially normal to the first said attitude for parting said web stock, camming track following members travelling in said camming track and coupled to said one ticket parting anvil member, and camming diverter means arranged in said camming track for engaging said camming track follower members for selectively changing the attitude of said one ticket parting anvil member.

2. A ticket information recording and parting mechanism as defined in claim 1 and wherein said web ticket stock has a magnetic stripe thereon, and said information recording member is an electromagnetic transducer arranged for recording on and reproducing from said magnetic stripe as said transducer revolves in said carrier and passes over said ticket web stock.

3. A ticket parting mechanism for producing individual tickets from web ticket stock without waste, comprising a frame structure, a continuously rotating carrier arranged on said frame structure and carrying one web parting member rotatably mounted within said carrier, a complementary web parting member arranged on said frame structure, a web advancing arrangement on said frame structure for passing a web about a part of said carrier and between said ticket web parting members, a camming track arranged on said frame structure and having a portion of generally regular loop configuration in which said one ticket web parting member is carried in one attitude and another portion of loop configuration digressing from said generally regular loop configuration in which said one ticket web parting member is carried to another attitude, camming track following members travelling in said camming track and coupled to said one ticket parting member for controlling the attitude of said one ticket web parting member, and camming diverter means arranged in said camming track for engaging said camming track follower members for guiding said track follower members from said one portion of said camming track to said other portion for rotating said one ticket parting member from an idle attitude to a parting attitude.

4. A ticket parting mechanism as defined in claim 3 and wherein said one ticket web parting member is an anvil member, and said complementary ticket web parting member is a blade member.

5. A ticket parting mechanism as defined in claim 4 and wherein said anvil member is dimensioned to contact said blade member in the parting attitude of the mechanism.

6. A ticket parting mechanism as defined in claim 4 and wherein said anvil member is double-ended and said camming track is of configuration for rotating said anvil member ninety degrees at each revolution of said carrier.

7. A ticket parting mechanism as defined in claim 3 and wherein said camming diverter means comprise pins alternately interposed in said camming track at each selection between the parting and idle attitudes for guiding said camming track following members into but one of said portions at each selection.

8. A ticket parting mechanism as defined in claim 7 and incorporating a pair of electromagnetic solenoids arranged on said frame structure behind said camming track with the axes of the armatures at the location of said pins, and said pins comprise the armatures of said electromagnetic solenoids.

* * * * *